(12) United States Patent
Morimoto et al.

(10) Patent No.: US 10,946,764 B2
(45) Date of Patent: Mar. 16, 2021

(54) CONTROLLER FOR VEHICLE

(71) Applicant: DENSO CORPORATION, Kariya (JP)

(72) Inventors: Youhei Morimoto, Kariya (JP); Yutaro Ito, Kariya (JP); Noriaki Ikemoto, Kariya (JP); Masuhiro Kondo, Kariya (JP); Takahiro Narita, Kariya (JP)

(73) Assignee: DENSO CORPORATION, Kariya (JP)

( * ) Notice: Subject to any disclaimer, the term of this patent is extended or adjusted under 35 U.S.C. 154(b) by 341 days.

(21) Appl. No.: 15/765,158

(22) PCT Filed: Oct. 6, 2016

(86) PCT No.: PCT/JP2016/079720
§ 371 (c)(1),
(2) Date: Mar. 30, 2018

(87) PCT Pub. No.: WO2017/077808
PCT Pub. Date: Nov. 5, 2017

(65) Prior Publication Data
US 2018/0273021 A1 Sep. 27, 2018

(30) Foreign Application Priority Data

Nov. 6, 2015 (JP) ............................. JP2015-218983

(51) Int. Cl.
*B60K 6/442* (2007.10)
*B60K 6/445* (2007.10)
(Continued)

(52) U.S. Cl.
CPC .............. *B60L 58/13* (2019.02); *B60K 6/442* (2013.01); *B60K 6/445* (2013.01); *B60K 6/485* (2013.01);
(Continued)

(58) Field of Classification Search
CPC ......... B60L 2240/662; B60L 2240/545; B60L 50/16; B60L 2240/622; B60L 2240/647;
(Continued)

(56) References Cited

U.S. PATENT DOCUMENTS

2002/0069000 A1 6/2002 Nakao
2008/0319595 A1* 12/2008 Yamamoto .......... B60L 15/2045
701/22
(Continued)

FOREIGN PATENT DOCUMENTS

JP 2007-050888 A 3/2007

*Primary Examiner* — Kelly D Williams
(74) *Attorney, Agent, or Firm* — Oliff PLC

(57) ABSTRACT

A controller is applied to a vehicle including an engine (11) and a motor generator (12 and 13) as power sources of the vehicle and a battery (20) that transfers power with the motor generator. The controller charges the battery with a regeneration power that is a power regenerated by the motor generator when the vehicle is decelerated. The controller includes a SOC prediction unit (39, 50 and 205) to predict a SOC indicating a remaining capacity of the battery in a scheduled travel route of the vehicle, based on a predicted result of a road grade and a vehicle speed in the scheduled travel route, a discharge control unit (39, 52, 206, 208 and 301 to 303) to execute a discharge increasing control to previously increase a discharge quantity of the battery to prevent the battery from becoming in a saturation state based on a predicted SOC that is the SOC predicted by the SOC prediction unit, when the discharge control unit determines that the battery becomes in the saturation state where the battery cannot be charged with the regeneration power based on the predicted SOC, a determination unit (39 and 105 to 109) to determine whether a behavior of the predicted SOC shifts from a behavior of an actual SOC or determine whether a SOC shift factor occurs, after a start of the discharge increasing control, where the SOC shift factor is (Continued)

a vehicle control or an environment change that predicts the behavior of the predicted SOC shifts from the behavior of the actual SOC, and a correction unit (39, 110, 201 to 209 and 301 to 303) to correct the discharge increasing control by executing a prediction of the SOC in the scheduled travel route again, when the determination unit determines that the behavior of the predicted SOC shifts from the behavior of the actual SOC or determines that the SOC shift factor occurs.

11 Claims, 12 Drawing Sheets

(51) Int. Cl.
| | | |
|---|---|---|
| | *B60K 6/485* | (2007.10) |
| | *B60L 50/61* | (2019.01) |
| | *B60L 58/13* | (2019.01) |
| | *B60L 58/15* | (2019.01) |
| | *B60L 7/10* | (2006.01) |
| | *B60W 10/06* | (2006.01) |
| | *B60W 10/26* | (2006.01) |
| | *B60W 20/00* | (2016.01) |
| | *B60W 20/11* | (2016.01) |
| | *B60W 20/12* | (2016.01) |
| | *B60W 40/06* | (2012.01) |
| | *B60W 40/105* | (2012.01) |
| | *B60K 6/54* | (2007.10) |
| | *B60L 58/16* | (2019.01) |
| | *G06N 5/02* | (2006.01) |
| | *B60W 10/08* | (2006.01) |
| | *B60L 50/16* | (2019.01) |

(52) U.S. Cl.
CPC ............... *B60K 6/54* (2013.01); *B60L 58/15* (2019.02); *B60L 58/16* (2019.02); *B60W 10/06* (2013.01); *B60W 10/08* (2013.01); *B60W 10/26* (2013.01); *B60W 20/00* (2013.01); *B60W 20/11* (2016.01); *B60W 20/12* (2016.01); *B60W 40/06* (2013.01); *B60W 40/105* (2013.01); *G06N 5/022* (2013.01); *B60K 2370/00* (2019.05); *B60K 2370/169* (2019.05); *B60L 7/10* (2013.01); *B60L 50/16* (2019.02); *B60L 50/61* (2019.02); *B60L 2240/545* (2013.01); *B60L 2240/622* (2013.01); *B60L 2240/642* (2013.01); *B60L 2240/645* (2013.01); *B60L 2240/647* (2013.01); *B60L 2240/662* (2013.01); *B60L 2260/54* (2013.01); *B60W 2510/244* (2013.01); *B60W 2554/00* (2020.02); *B60W 2556/50* (2020.02); *Y02T 10/62* (2013.01); *Y02T 10/7072* (2013.01); *Y10S 903/93* (2013.01)

(58) Field of Classification Search
CPC ...... B60L 2240/642; B60L 7/10; B60L 50/61; B60L 2260/54; B60L 2240/645; B60L 58/13; B60L 58/15; B60L 58/16; Y02T 10/6239; Y02T 10/6286; Y02T 10/6234; Y02T 10/6226; Y02T 10/7077; B60K 2370/00; B60K 2370/169; B60K 6/442; B60K 6/54; B60K 6/445; B60K 6/485; Y10S 903/93; B60W 20/12; B60W 20/00; B60W 20/11; B60W 10/06; B60W 40/06; B60W 40/105; B60W 10/08; B60W 10/26; B60W 2554/00; B60W 2556/50; B60W 2510/244; G06N 5/022
See application file for complete search history.

(56) References Cited

U.S. PATENT DOCUMENTS

2008/0319597 A1  12/2008  Yamada
2010/0131139 A1  5/2010  Sakai et al.

* cited by examiner (a) DESTINATION POSITION INFORMATION & ROUTES WITH MULTIPLE JUNCTIONS (b) NON-DESTINATION POSITION INFORMATION & ROUTE WITHOUT MULTIPLE JUNCTIONS (c) NON-DESTINATION POSITION INFORMATION & ROUTES WITH MULTIPLE JUNCTIONS

CONTROLLER FOR VEHICLE

CROSS REFERENCE TO RELATED APPLICATION

This application is based on Japanese Patent Application No. 2015-218983 filed on Nov. 6, 2015, the disclosure of which is incorporated herein by reference.

TECHNICAL FIELD

The present disclosure relates to a controller applied to a vehicle including an engine and a motor generator as power sources of the vehicle.

BACKGROUND

Recently, it is paid attention that a hybrid vehicle is mounted with an engine and a motor generator (MG) as power sources of the hybrid vehicle in response to a social request of a low fuel consumption and a low emission. In the hybrid vehicle, since a battery is charged with a power (regeneration power) regenerated by the MG when the hybrid vehicle is decelerated, an execution time interval of an assist travel using the power of the MG and an executive time interval of an EV travel using the power of the MG can be extended, and a fuel consumption can be improved.

However, when a power regeneration is executed while the hybrid vehicle is on a long downgrade road, it is possible that a SOC indicating a remaining capacity of the battery reaches an upper limit and the battery is in a saturation state that the battery cannot be charged with the regeneration power.

According to Patent Literature 1, a deep discharge control is executed to discharge the battery to have the remaining capacity less than or equal to an intermediate region in a travel phase right before a downgrade travel phase, based on a road information obtained from a navigation device.

PRIOR ART LITERATURES

Patent Literature

Patent Literature 1: JP2002-171603A

SUMMARY OF INVENTION

The inventors study a following system to prevent the battery from becoming in the saturation state that the battery cannot be charged with the regeneration power. A system predicts a predicted SOC that is a SOC in a scheduled travel route based on a predicted result of a road grade and a vehicle speed in the scheduled travel route of the hybrid vehicle. When the system determines or predicts that the battery is in the saturation state based on the predicted SOC, the system previously executes a discharge increasing control to increase a discharge quantity of the battery to prevent the battery from becoming in the saturation state based on the predicted SOC. In this case, the system prevents the SOC from reaching the upper limit. However, following matters are concerned in the study.

When a behavior of the predicted SOC shifts with respect to a behavior of an actual SOC, it is possible that the SOC is improperly controlled in a case where the discharge increasing control is executed based on the predicted SOC, and it is possible that the battery is in the saturation state. The power regeneration cannot be effectively used, and it is possible that the fuel consumption cannot be effectively improved.

It is an object of the present disclosure to provide a controller applied to a vehicle which can surely prevent a battery from becoming in a saturation state, can effectively use a power regeneration and can effectively improve a fuel consumption.

According to an aspect of the present disclosure, the controller is applied to the vehicle including an engine and a motor generator as power sources of the vehicle and a battery that transfer power with the motor generator. The controller charges the battery with a regeneration power that is a power regenerated by the motor generator when the vehicle is decelerated. The controller includes a SOC prediction unit to predict a SOC indicating a remaining capacity of the battery in a scheduled travel route of the vehicle, based on a predicted result of a road grade and a vehicle speed in the scheduled travel route, a discharge control unit to execute a discharge increasing control to previously increase a discharge quantity of the battery to prevent the battery from becoming in a saturation state based on a predicted SOC that is the SOC predicted by the SOC prediction unit, when the discharge control unit determines that the battery becomes in the saturation state where the battery cannot be charged with the regeneration power based on the predicted SOC, a determination unit to determine whether a behavior of the predicted SOC shifts from a behavior of an actual SOC or determine whether a SOC shift factor occurs, after a start of the discharge increasing control, where the SOC shift factor is a vehicle control or an environment change that predicts the behavior of the predicted SOC shifts from the behavior of the actual SOC, and a correction unit to correct the discharge increasing control by executing a prediction of the SOC in the scheduled travel route again, when the determination unit determines that the behavior of the predicted SOC shifts from the behavior of the actual SOC or determines that the SOC shift factor occurs.

According to the above configuration, the controller predicts the predicted SOC that is the SOC in the scheduled travel route based on the predicted result of the road grade and the vehicle speed in the scheduled travel route. When the controller determines or predicts that the battery is in the saturation state based on the predicted SOC, the controller previously executes a discharge increasing control to increase a discharge quantity of the battery to prevent the battery from becoming in the saturation state based on the predicted SOC. In this case, the system prevents the SOC from reaching the upper limit. Thus, when the predicted SOC is correct, the controller controls to prevent the SOC from reaching the upper limit by executing the discharge increasing control based on the predicted SOC. It can be prevented that the battery becomes in the saturation state.

However, when the behavior of the predicted SOC shifts from the behavior of the actual SOC, it is possible that the SOC is improperly controlled when the discharge increasing control is executed based on the predicted SOC, and it is possible that the battery is in the saturation state.

The controller determines whether the behavior of the predicted SOC shifts relative to the behavior of the actual SOC or determines whether a SOC shift factor occurs, after a start of the discharge increasing control. When the controller determines that the behavior of the predicted SOC shifts from the behavior of the actual SOC or determines that the SOC shift factor occurs, the controller executes the prediction of the SOC in the scheduled travel route again and corrects the discharge increasing control. Thus, when the behavior of the predicted SOC shifts from the behavior of the actual SOC, the controller can correct the predicted SOC by executing the prediction of the SOC again. The controller corrects the discharge increasing control based on the predicted SOC that is corrected. Thus, the controller can prevent that the battery is in the saturation state by controlling the SOC to be less than the upper limit by the discharge increasing control that is corrected. Thus, the controller can surely prevent the battery from becoming in the saturation state, can effectively use the power regeneration and can effectively improve the fuel consumption.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
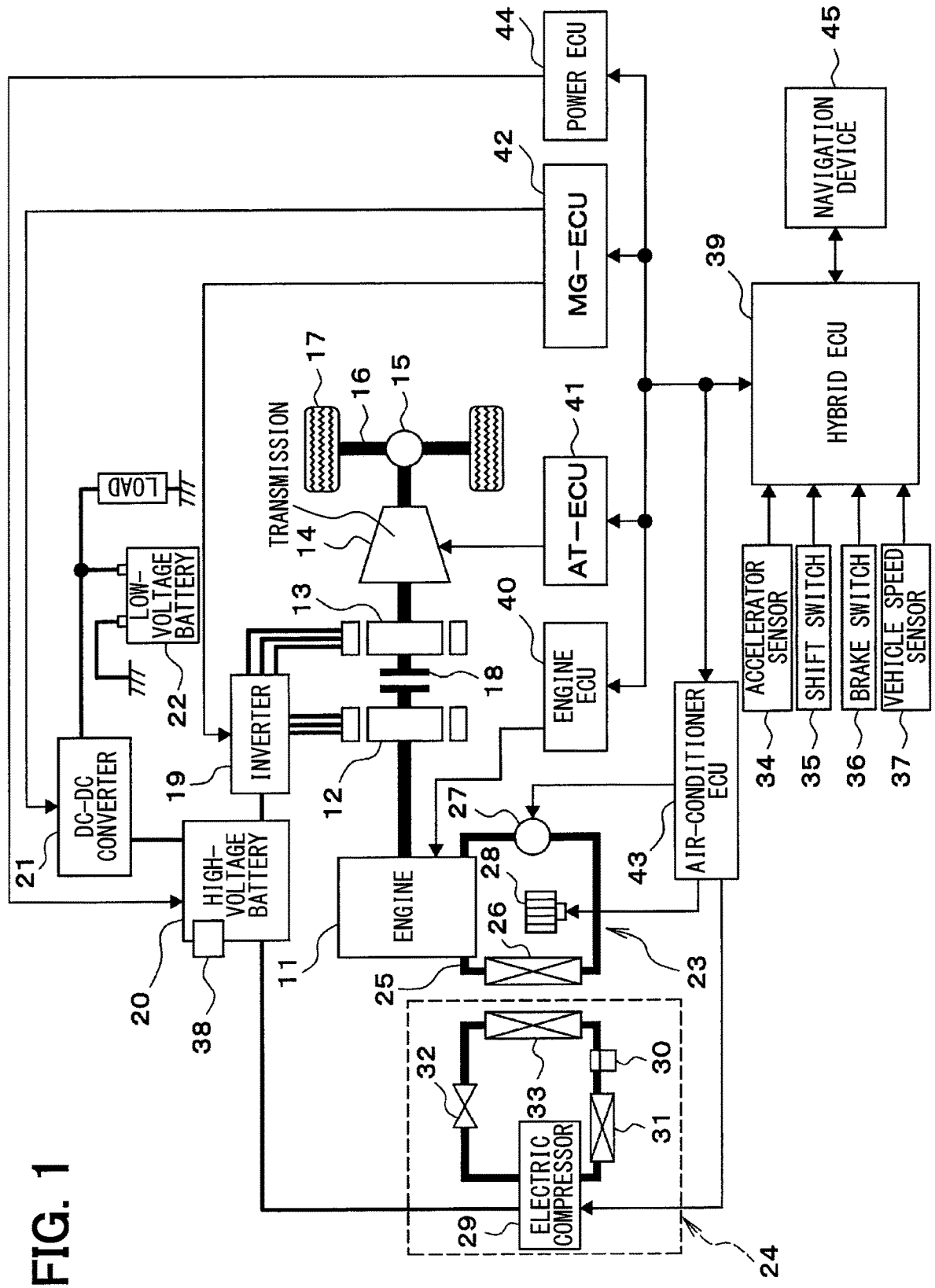
FIG. 1 is a schematic diagram showing an outline of a control system of a hybrid vehicle according to a first embodiment of the present disclosure.

Hereafter, embodiments of the present disclosure will be detailed.

First Embodiment

A first embodiment of the present disclosure will be described with reference to FIGS. 1 to 11.

First, an outline of a control system of a hybrid vehicle will be described referring to FIG. 1.

An engine 11 that is an internal combustion engine, a first motor generator (first MG) 12 and a second motor generator (second MG) 13 are mounted to a vehicle that is the hybrid vehicle, as power sources. A power of a crank shaft that is an output shaft of the engine 11 is transmitted to a transmission 14 through the first MG 12 and the second MG 13. A power of an output shaft of the transmission 14 is transmitted to a driving wheel that is a wheel 17 through a differential gear mechanism 15 and an axle 16. The transmission 14 may be a stage transmission that switches between multiple transmission stages (levels) or may be a continuously variable transmission (CVT) that changes a speed with non-stage. A clutch 18 is between the first MG 12 and the second MG 13. The clutch 18 allows and interrupts a power transmission.

An inverter 19 that drives the first MG 12 and the second MG 13 is connected with a high-voltage battery 20. The first MG 12 and the second MG 13 transfer power with the high-voltage battery 20 through the inverter 19. A low-voltage battery 22 is connected with the high-voltage battery 20 through a DC-DC converter 21. The high-voltage battery 20 and the low-voltage battery 22 are batteries that can be charged and discharged. A low-voltage load is connected with the DC-DC converter 21. The low-voltage load consumes power supplied from the high-voltage battery 20 through the DC-DC converter 21 or consumes power supplied from the low-voltage battery 22. The low-voltage load, for example, may be an electric water pump 27 or a blower fan 28.

A warm-water heater 23 that uses a heat of a coolant of the engine 11 and an electric air-conditioner 24 such as a heat pump device are mounted to the vehicle.

The warm-water heater 23 includes a warm-water circuit 25 that is connected with a coolant passage (water jacket) of the engine 11. The warm-water circuit 25 includes a heater core 26 for heating and the electric water pump 27. The electric water pump 27 circulates the coolant (or warm water) between the engine 11 and the heater core 26. The blower fan 28 that generates a warm wind is located in the vicinity of the heater core 26.

The electric air-conditioner 24 includes an electric compressor 29, an accumulator 30, an outer heat exchanger 31, an expansion valve 32 and an inner heat exchanger 33. The electric compressor 29 receives power from the high-voltage battery 20.

An accelerator sensor 34 senses an accelerator position that is an operation quantity of an accelerator pedal. A shift switch 35 senses an operation position of a shift lever. A brake switch 36 senses a brake operation (or a brake sensor senses a brake operation quantity). A vehicle speed sensor 37 senses a vehicle speed. A battery temperature sensor 38 senses a temperature of the high-voltage battery 20.

A hybrid ECU 39 is a control unit that generally controls the entire vehicle. The hybrid ECU 39 loads output signals of various sensors and switches, and detects an operation state of the vehicle. The hybrid ECU 39 sends control signals and data signals to an engine ECU 40, an AT-ECU 41, a MG-ECU 42 and an air-conditioner ECU 43 and receives control signals and data signals from the engine ECU 40, the AT-ECU 41, the MG-ECU 42 and the air-conditioner ECU 43. According to the present embodiment, the hybrid ECU 39 is a controller applied to the vehicle.

The engine ECU 40 is a control unit that controls an operation of the engine 11. The AT-ECU 41 is a control unit that controls the transmission 14. The MG-ECU 42 is a control unit that controls the first MG 12 and the second MG 13 by controlling the inverter 19 and controls the DC-DC converter 21. The air-conditioner ECU 43 is a control unit that controls the warm-water heater 23 and the electric air-conditioner 24 (e.g., the electric water pump 27, the blower fan 28, or the electric compressor 29).

The hybrid ECU 39 controls the engine11, the transmission 14, the first MG 12, the second MG 13, the DC-DC converter 21, the warm-water heater 23 and the electric air-conditioner 24, according to the operation state of the vehicle obtained from ECUs 40 to 43. The hybrid ECU 39 sends control signals and data signals to a power ECU 44 and a navigation device 45 and receives control signals and data signals from the power ECU 44 and the navigation device 45. The power ECU 44 monitors the high-voltage battery 20.

The hybrid ECU 39 switches a travel mode between an engine travel mode, an assist travel mode and an EV travel mode. In the engine travel mode, the vehicle travels by executing an engine travel to drive the wheel 17 only by power of the engine 11. In the assist travel mode, the vehicle travels by executing an assist travel to drive the wheel 17 using power of the engine 11 and at least power of the second MG 13 between the first MG 12 and the second MG 13. In this case, the wheel 17 may be driven by power of the engine 11 and power of the second MG 13, or may be driven by power of the engine 11, power of the first MG 12 and power of the second MG 13. In the EV travel mode, the vehicle travels by executing an EV travel to drive the wheel 17 using at least power of the second MG 13 between the first MG 12 and the second MG 13. In this case, the wheel 17 may be driven only by power of the second MG 13, or may be driven by power of the first MG 12 and power of the second MG 13.

When the vehicle decelerated (e.g., a braking force is generated while the accelerator is off or the brake is on), the hybrid ECU 39 switches the travel mode to a power regeneration mode. In the power regeneration mode, only the second MG 13 or both the first MG 12 and the second MG 13 are driven by power of the wheel 17. In this case, a kinematic energy of the vehicle is converted into an electric energy by only the second MG 13 or both the first MG 12 and the second MG 13 to execute a power regeneration, and the high-voltage battery 20 is charged with a regeneration power that is a power regenerated by the power regeneration. Thus, an executive time interval of the assist travel and an executive time interval of the EV travel can be extended, and a fuel consumption can be improved.

When the power generation is executed while the vehicle is on a long downgrade road, it is possible that a SOC reaches an upper limit and the high-voltage battery 20 is in a saturation state that the high-voltage battery 20 cannot be charged with the regeneration power. The SOC that is a state of charge indicates a remaining capacity of the high-voltage battery 20. The SOC, for example, is defined by a following equation.

SOC=remaining capacity/full charge capacity×100

Figure 4:
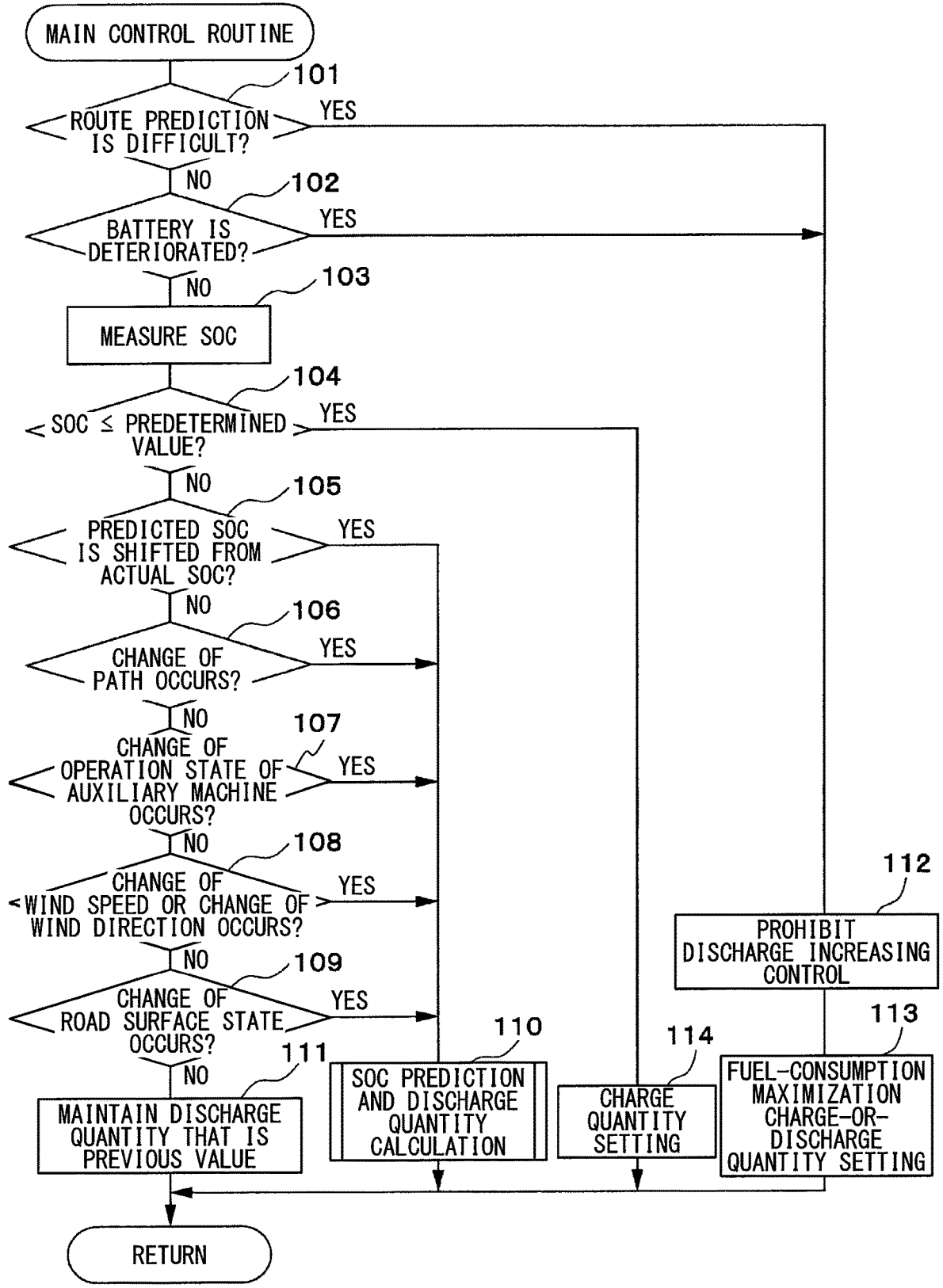
FIG. 4 is a flowchart showing a processing of a main control routine.
Figure 5:
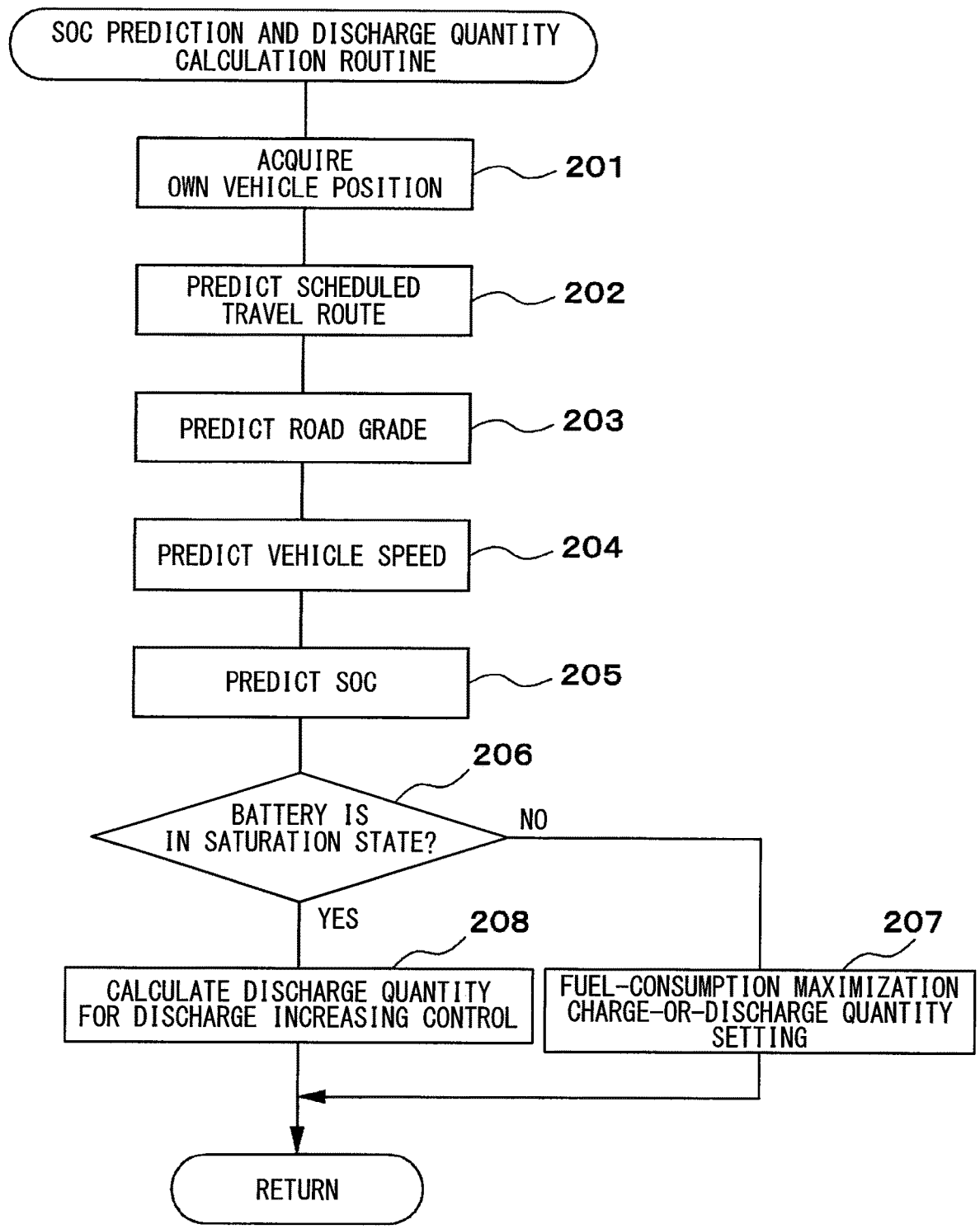
FIG. 5 is a flowchart showing a processing of a SOC prediction and discharge quantity calculation routine.
Figure 6:
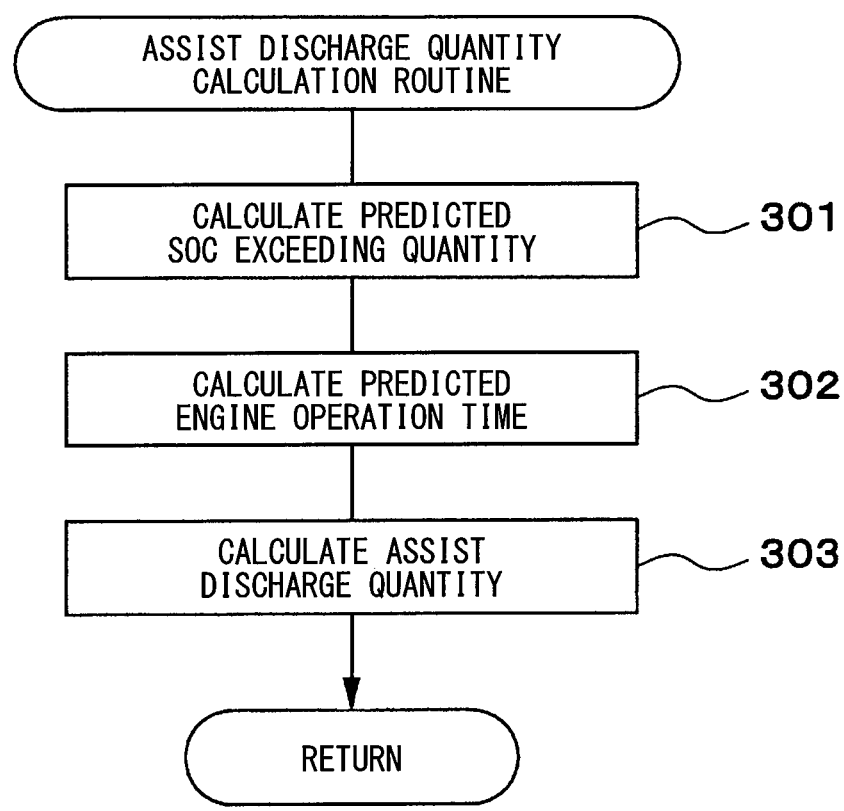
FIG. 6 is a flowchart showing a processing of an assist discharge quantity calculation routine.

According to the first embodiment, the hybrid ECU 39 executes routines shown in FIGS. 4 to 6 as following to prevent that the high-voltage battery 20 becomes in the saturation state where the high-voltage battery 20 cannot be charged with the regeneration power.

The hybrid ECU 39 predicts a predicted SOC that is the SOC in a scheduled travel route of the vehicle, based on predicted results of a road grade and the vehicle speed in the scheduled travel route. When the hybrid ECU 39 determines or predicts that the high-voltage battery 20 is in the saturation state based on the predicted SOC, the hybrid ECU 39 previously executes a discharge increasing control to increase a discharge quantity of the high-voltage battery 20 to prevent the high-voltage battery 20 from becoming in the saturation state based on the predicted SOC. In this case, the hybrid ECU 39 prevents the SOC from reaching the upper limit. The hybrid ECU 39 increases the discharge quantity of the high-voltage battery 20, by an assist discharge to execute a discharge of the high-voltage battery 20 by the assist travel, or by an EV discharge to execute the discharge of the high-voltage battery 20 by the EV travel. Thus, when the predicted SOC is correct, the hybrid ECU 39 controls to prevent the SOC from reaching the upper limit by executing the discharge increasing control based on the predicted SOC. It can be prevented that the high-voltage battery 20 becomes in the saturation state. According to the present embodiment, the hybrid ECU 39 includes a road grade prediction unit 46, a vehicle speed prediction unit 47, a travel output calculation unit 48, a battery output calculation unit 49, a SOC prediction unit 50, a discharge quantity calculation unit 51 and a discharge control unit 52.

Figure 2:
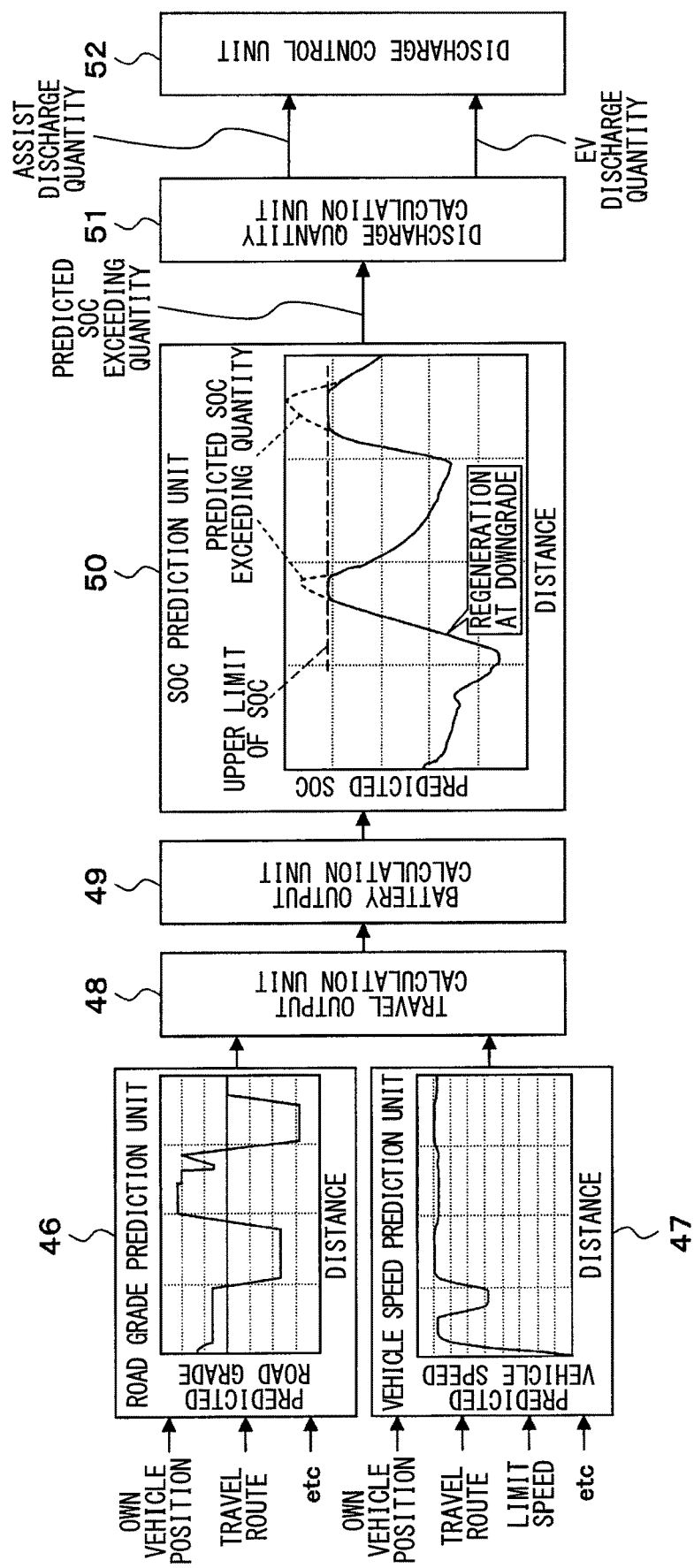
FIG. 2 is a block diagram showing functions of a SOC prediction and a discharge increasing control.

Specifically, as shown in FIG. 2, the road grade prediction unit 46 predicts a behavior of a road grade from a current position to a predetermined destination position in the scheduled travel route, based on an own vehicle position information and a travel route information obtained by the navigation device 45 or by a locator. In this case, a predetermined distance from the current position to the predetermined destination position is, for example, 10 km.

The vehicle speed prediction unit 47 predicts a behavior of the vehicle speed from the current position to the predetermined destination position in the scheduled travel route, based on the own vehicle position information, the travel route information and a limit speed information obtained by the navigation device or the locator and based on a traffic information, a weather information and a peripheral information obtained by a high-level drive assist system.

The travel output calculation unit 48 calculates or predicts a behavior of a travel output from the current position to the predetermined destination position in the scheduled travel route, based on a predicted result of the road grade and the vehicle speed in the scheduled travel route.

The battery output calculation unit 49 calculates or predicts a behavior of a charge-or-discharge power that is an output of the high-voltage battery 20 from the current position to the predetermined destination position in the scheduled travel route, based on a calculation result or a predicted result of the travel output in the scheduled travel route. In this case, for example, the battery output calculation unit 49 predicts a change pattern of the travel mode which is a travel pattern in the scheduled travel route, based on the behavior of the travel output in the travel scheduled route. In the engine travel mode, the battery output calculation unit 49 calculates the output of the high-voltage battery 20 based on outputs of the first MG 12 and the second MG 13 and consumption powers of auxiliary machines in the engine travel. In this case, for example, the outputs of the first MG 12 and the second MG 13 are generation powers, and the auxiliary machines include the electric compressor 29. In the assist travel mode, the battery output calculation unit 49 calculates the output of the high-voltage battery 20 based on the outputs of the first MG 12 and the second MG 13 and the consumption powers of the auxiliary machines in the assist travel. In this case, for example, the outputs of the first MG 12 and the second MG 13 are consumption powers. In the EV travel mode, the battery output calculation unit 49 calculates the output of the high-voltage battery 20 based on the outputs of the first MG 12 and the second MG 13 and the consumption powers of the auxiliary machines in the EV travel. In this case, for example, the outputs of the first MG 12 and the second MG 13 are consumption powers. In the power regeneration mode, the battery output calculation unit 49 calculates the output of the high-voltage battery 20 based on the outputs of the first MG 12 and the second MG 13 and the consumption powers of the auxiliary machines in the power regeneration. In this case, for example, the outputs of the first MG 12 and the second MG 13 are generation powers.

The SOC prediction unit 50 predicts a behavior of the SOC from the current position to the predetermined destination position in the scheduled travel route, based on a calculation result of the output of the high-voltage battery 20 in the scheduled travel route. The SOC prediction unit 50 determines whether the high-voltage battery 20 is in the saturation state where the high-voltage battery 20 cannot be charged with the regeneration power, by determining whether the predicted SOC reaches the upper limit that is a value in a fully charged state or in a state close to the fully charged state. When the SOC prediction unit 50 determines that the high-voltage battery 20 is in the saturation state, the SOC prediction unit 50 calculates a power regeneration quantity by which exceeding the upper limit, as a predicted SOC exceeding quantity. In this case, the power regeneration quantity is a quantity of the regeneration power that is predicted to be charged when the high-voltage battery 20 is not in the saturation state.

Figure 3:
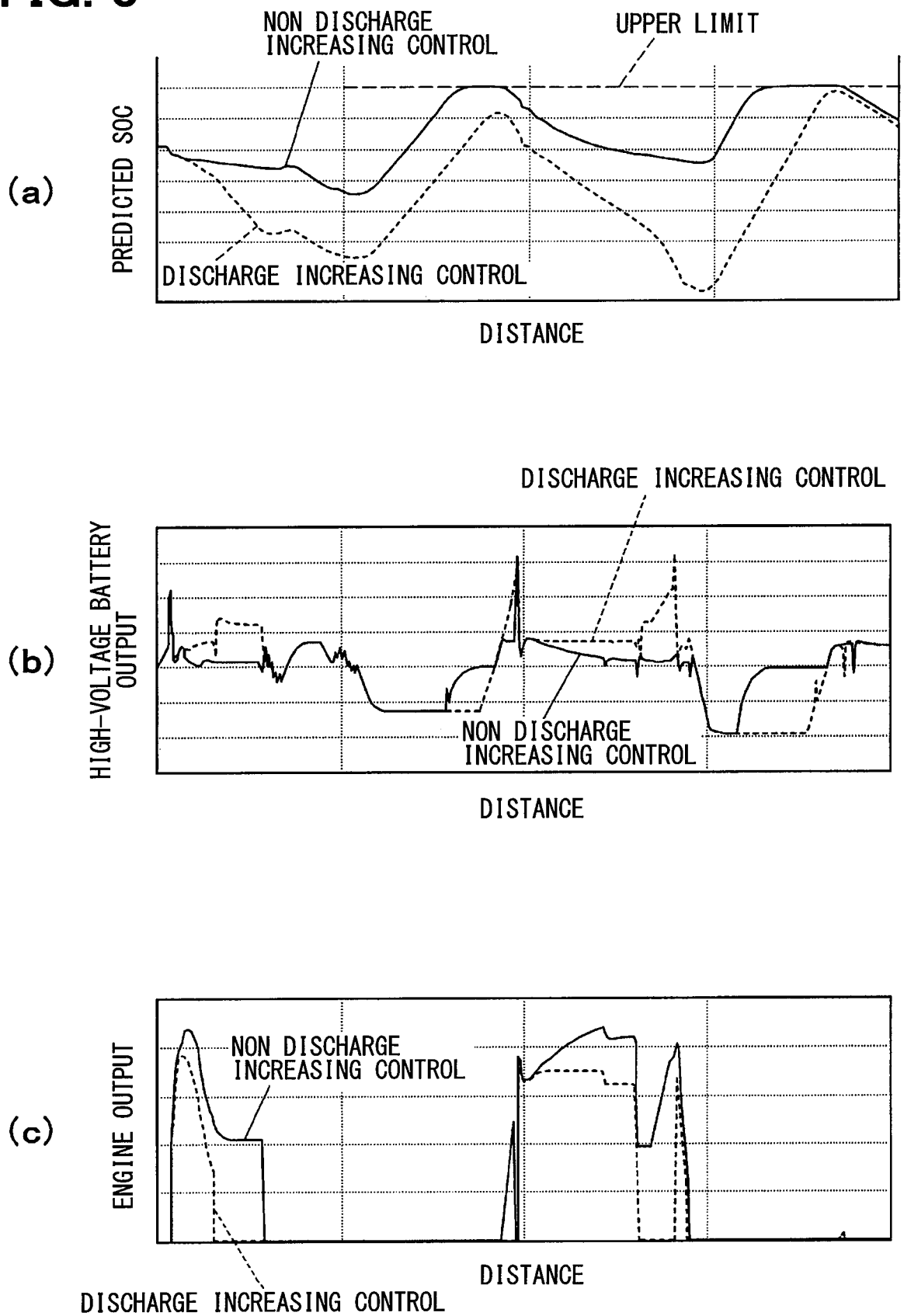
FIG. 3 includes (a), (b) and (c), (a) is a graph showing a behavior of a predicted SOC over distance, (b) is a graph showing a behavior of a high-voltage battery output over distance, (c) is a graph showing a behavior of an engine output over distance.

The discharge quantity calculation unit 51 calculates the discharge quantity of the high-voltage battery 20 by the assist discharge which is an assist discharge quantity for the discharge increasing control in the scheduled travel route or the discharge quantity of the high-voltage battery 20 by the EV discharge which is an EV discharge quantity in the scheduled travel route, based on the predicted SOC exceeding quantity. In this case, as shown in FIG. 3, the discharge quantity calculation unit 51 sets the assist discharge quantity and the EV discharge quantity for the discharge increasing control such that the behavior of the predicted SOC when the discharge increasing control is executed does not reach the upper limit, based on the behavior of an initial predicted SOC that is the predicted SOC when the discharge increasing control is not executed. The behavior of the output of the high-voltage battery 20 differs in a case where the discharge increasing control is not executed and a case where the discharge increasing control is executed. In this case, an output of the engine 11 may be set such that the travel output in a case where the discharge increasing control is not executed is substantially equal to the travel output in a case where the discharge increasing control is executed. The discharge quantity calculation unit 51 may set the assist discharge quantity and the EV discharge quantity such that the power quantity greater than or equal to the predicted SOC exceeding quantity is consumed in the assist discharge and the EV discharge until a start of the power regeneration that the predicted SOC is initially predicted to reach the upper limit. In this case, an initial prediction is executed to initially predict the predicted SOC reaches the upper limit. Alternatively, the discharge quantity calculation unit 51 may set the assist discharge quantity and the EV discharge quantity such that the power quantity greater than or equal to the predicted SOC exceeding quantity is consumed, in the assist discharge and the EV discharge until the start of the power regeneration that the predicted SOC is initially predicted to reach the upper limit and in the assist discharge and the EV discharge until a start of the power regeneration that the predicted SOC is predicted to reach the upper limit after the initial prediction. A time interval of the assist travel and a time interval of the EV travel may be extended.

The discharge control unit 52 executes the discharge increasing control to increase the discharge quantity of the high-voltage battery 20, by controlling the engine 11, the first MG 12 and the second MG 13 to achieve the assist discharge quantity and the EV discharge quantity in the scheduled travel route.

When the behavior of the predicted SOC shifts from a behavior of an actual SOC, it is possible that the SOC is improperly controlled when the discharge increasing control is executed based on the predicted SOC and it is possible that the high-voltage battery 20 is in the saturation state.

After a start of the discharge increasing control, the discharge control unit 52 determines whether the behavior of the predicted SOC shifts relative to the behavior of the actual SOC or determines whether a SOC shift factor that is predicted to lead the behavior of the predicted SOC to shift from the behavior of the actual SOC occurs. In this case, the SOC shift factor includes a vehicle control and an environment change. When the discharge control unit 52 determines that the behavior of the predicted SOC shifts from the behavior of the actual SOC or determines that the SOC shift factor occurs, the discharge control unit 52 executes a prediction of the SOC in the scheduled travel route again and corrects the discharge increasing control. Thus, when the behavior of the predicted SOC shifts from the behavior of the actual SOC, the predicted SOC can be corrected by executing the prediction of the SOC again. The discharge increasing control is corrected based on the predicted SOC that is corrected. Thus, it can be prevented that the high-voltage battery 20 is in the saturation state by controlling the SOC to be less than the upper limit by the discharge increasing control that is corrected.

Hereafter, routines executed by the hybrid ECU 39 according to the first embodiment will be described referring to FIGS. 4 to 6.

As shown in FIG. 4, a main control routine is executed by the hybrid ECU 39 at a predetermined time period in a time interval where the hybrid ECU 39 is activated. When the present routine is activated, at 101, the hybrid ECU 39 determines whether a prediction of the scheduled travel route is difficult. In this case, when a destination position information of the vehicle cannot be obtained and a total number of junctions of routes is greater than or equal to a predetermined value, the hybrid ECU 39 determines that the prediction of the scheduled travel route is difficult. In this case, the predetermined value may be one or two.

Figure 7:
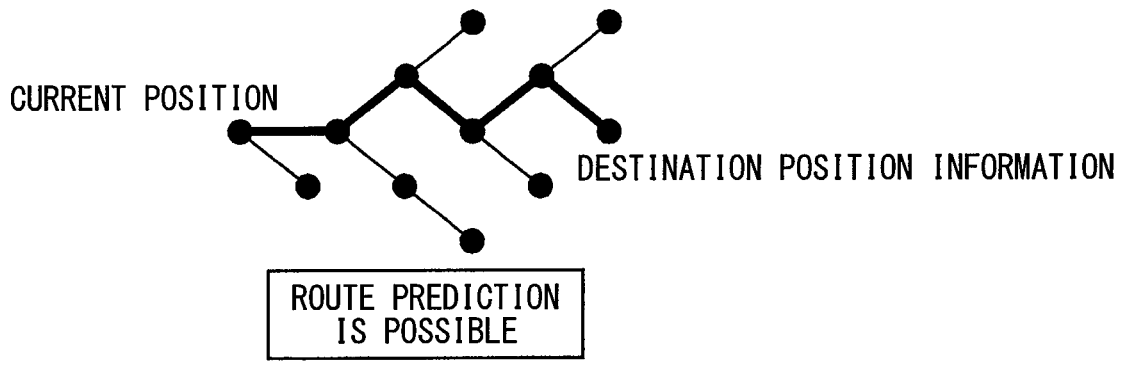
FIG. 7 includes (a), (b) and (c), (a) is a graph showing a condition where a route prediction is possible, (b) is a graph showing another condition where the route prediction is possible, (c) is a graph showing a condition where the route prediction is difficult.
Figure 7:
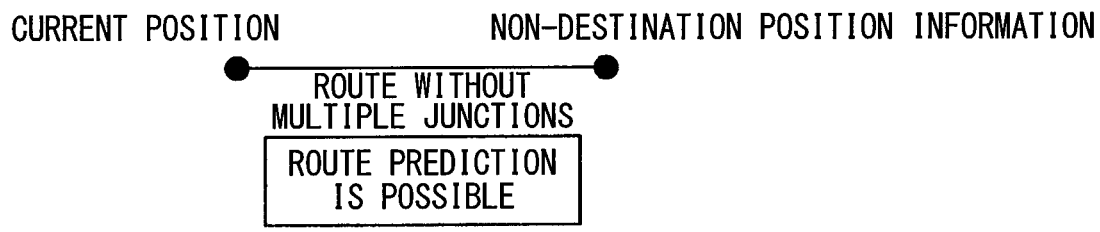
Figure 7:
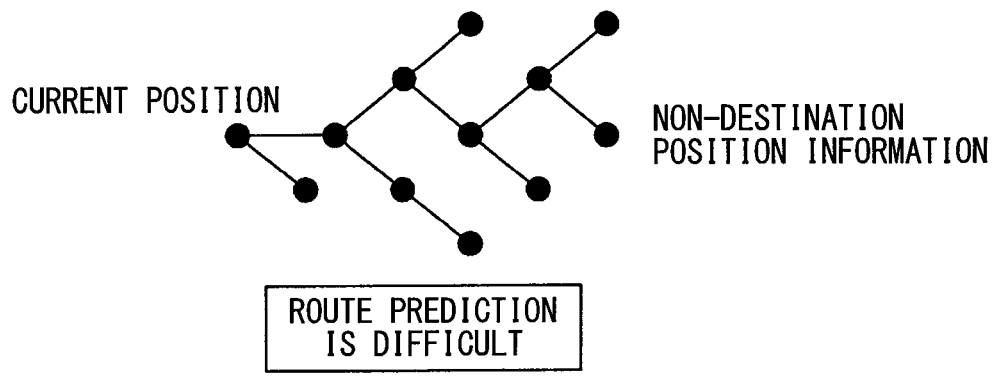
Figure 8:
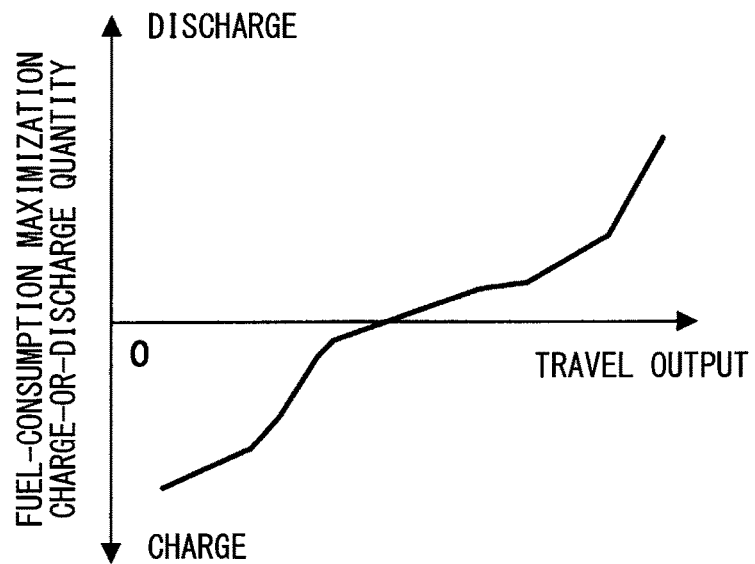
FIG. 8 is a graph showing a map of a fuel-consumption maximization charge-or-discharge quantity.

As shown in (a) of FIG. 7, when the destination position information exists while junctions of routes exist in a travelling direction, the scheduled travel route can be predicted. As shown in (b) of FIG. 7, when no junction exists or the total number of the junctions of routes in the travelling direction is small while the destination position information does not exist, the scheduled travel route can be predicted. As shown in (c) of FIG. 7, when the destination position information cannot be obtained while the total number of the junctions of routes in the travelling direction is greater than or equal to the predetermined value, it can be determined that the prediction of the scheduled travel route is difficult.

When the hybrid ECU 39 determined that the prediction of the scheduled travel route is difficult at 101, the hybrid ECU 39 proceeds to 112. At 112, the hybrid ECU 39 prohibits the discharge increasing control. In this case, operations in 101 and 112 function as a first prohibition unit.

Then, the hybrid ECU 39 proceeds to 113 and executes a fuel-consumption maximization charge-or-discharge quantity setting. In the fuel-consumption maximization charge-or-discharge quantity setting, the hybrid ECU 39 sets a charge quantity or a discharge quantity of the high-voltage battery 20 that the fuel consumption becomes maximum according to the travel output of the vehicle, by using a map of a fuel-consumption maximization charge-or-discharge quantity shown in FIG. 8. In this case, for example, the charge quantity is a charge power, and the discharge quantity is a discharge power. The hybrid ECU 39 controls the engine 11, the first MG 12 and the second MG 13 to achieve the charge quantity or the discharge quantity.

When the hybrid ECU 39 determines that the prediction of the scheduled travel route is not difficult at 101, that is, the hybrid ECU 39 determines that the scheduled travel route can be predicted at 101, the hybrid ECU 39 proceeds to 102. At 102, the hybrid ECU 39 determines whether the high-voltage battery 20 is deteriorated, based on at least one of a temperature of the high-voltage battery 20, a voltage of the high-voltage battery 20 or an inner resistance of the high-voltage battery 20. In other words, the hybrid ECU 39 determines whether a deterioration state of the high-voltage battery 20 is greater than or equal to a predetermined state.

When the hybrid ECU 39 determines that the high-voltage battery 20 is deteriorated at 102, the hybrid ECU 39 proceeds to 112 and prohibits the discharge increasing control. In this case, operations in 102 and 112 function as a second prohibition unit. Then, the hybrid ECU 39 proceeds to 113 and executes the fuel-consumption maximization charge-or-discharge quantity setting.

When the hybrid ECU 39 determines that the high-voltage battery 20 is not deteriorated at 102, the hybrid ECU 39 proceeds to 103. At 103, the hybrid ECU 39 measures the actual SOC of the high-voltage battery 20.

Then, the hybrid ECU 39 proceeds to 104 and determines whether the actual SOC is less than or equal to a predetermined value. In this case, the predetermined value is an allowable lower limit or a value slight greater than the allowable lower limit.

When the hybrid ECU 39 determines that the actual SOC is less than or equal to the predetermined value at 104, the hybrid ECU 39 proceeds to 114. At 114, the hybrid ECU 39 sets the charge quantity (charge power) of the high-voltage battery 20 to a total of consumption powers of the auxiliary machines including the electric compressor 29. Thus, the hybrid ECU 39 prohibits the discharge of the high-voltage battery 20, rotatably drives the first MG 12 or both the first MG 12 and the second MG 13 by the power of the engine 11, and generates power by the first MG 12 or both the first MG 12 and the second MG 13. In this case, a power generation quantity (generation power) of the first MG 12 or both the first MG 12 and the second MG 13 is the charge quantity of the high-voltage battery 20 and is a sum of the consumption powers of the auxiliary machines including the electric compressor 29. Operations in 104 and 114 function as a SOC decreasing suppression unit.

Figure 9:
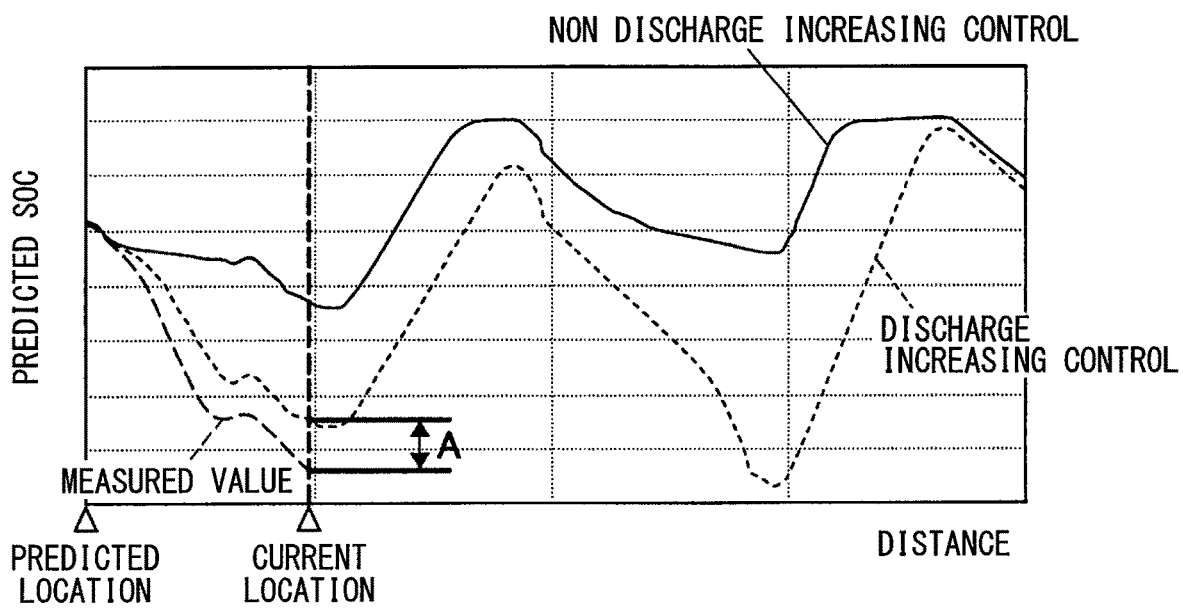
FIG. 9 is a graph showing a determination on whether the behavior of the predicted SOC shifts from a behavior of an actual SOC.
Figure 10:
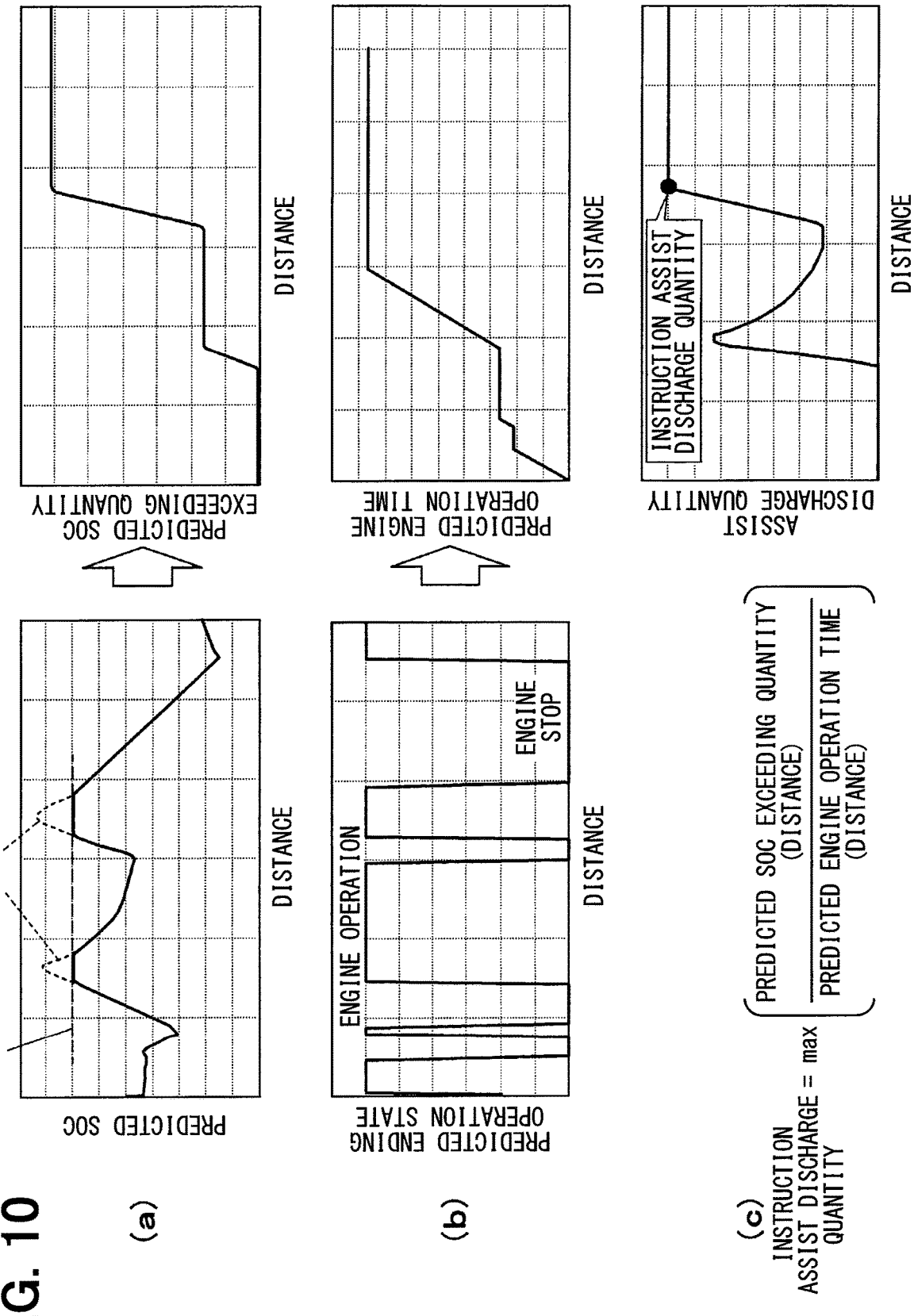
FIG. 10 includes (a), (b) and (c), (a) is a graph showing a calculation of a predicted SOC exceeding quantity, (b) is a graph showing a calculation of a predicted engine operation time, (c) is a graph showing a calculation of an assist discharge quantity.

When the hybrid ECU 39 determines that the actual SOC is greater than the predetermined value at 104, the hybrid ECU 39 proceeds to 105. At 105, the hybrid ECU 39 determines whether the behavior of the predicted SOC shifts relative to the behavior of the actual SOC. In this case, as shown in FIG. 9, the hybrid ECU 39 calculates the SOC by subtracting a discharge-quantity increasing quantity in the discharge increasing control from a prediction time point of the predicted SOC to a present time point from the predicted SOC at the present time point when the discharge increasing control is not executed, as the predicted SOC at a current position when the discharge increasing control is executed. The hybrid ECU 39 determines whether the behavior of the predicted SOC shifts from the behavior of the actual SOC by determining whether a difference A between the predicted SOC at the current position when the discharge increasing control is executed and the actual SOC at the current position is greater than or equal to a predetermined value.

At 105, the hybrid ECU 39 sets an initial value of the predicted SOC to a value that the hybrid ECU 39 determines that the behavior of the predicted SOC shifts relative to the behavior of the actual SOC. Thus, when the hybrid ECU 39 proceeds to 105 for the first time after the start of the present routine, the hybrid ECU 39 determines a positive determination at 105 (105: Yes) and proceeds to 110. At 110, the hybrid ECU 39 executes a SOC prediction and discharge quantity calculation routine shown in FIG. 5. In this case, the hybrid ECU 39 predicts the SOC in the scheduled travel route. When the hybrid ECU 39 determines that the high-voltage battery 20 is in the saturation state based on the predicted SOC, the hybrid ECU 39 calculates the discharge quantity (discharge power) for the discharge increasing control in the scheduled travel route and executes the discharge increasing control.

When the hybrid ECU 39 determines that the behavior of the predicted SOC does not shift from the behavior of the actual SOC at 105, the hybrid ECU 39 proceeds to 106. At 106, the hybrid ECU 39 determines whether a change of a travel route (path) occurs. When the travel route changes, the road grade and the vehicle speed change, and the travel output and the travel pattern that is the change pattern of the travel mode change. Thus, the output of the high-voltage battery 20 changes, and the behavior of the SOC changes. The change of the travel route is included in the SOC shift factor. In this case, the SOC shift factor is the vehicle control that predicts the behavior of the predicted SOC shifts from the behavior of the actual SOC.

When the hybrid ECU 39 determines that the change of the travel route does not occur at 106, the hybrid ECU 39 proceeds to 107. At 107, the hybrid ECU 39 determines whether a change of an operation state of the auxiliary machines including the electric air-conditioner 24 and a light occurs. In this case, the change of the operation state of the auxiliary machines including the electric air-conditioner 24 and the light includes a switch on operation and a switch off operation. When the operation state of the auxiliary machines changes, the consumption power of the auxiliary machines changes. Thus, the output of the high-voltage battery 20 changes, and the behavior of the SOC changes. The change of the operation state of the auxiliary machines is included in the SOC shift factor. In this case, the SOC shift factor is the vehicle control that predicts the behavior of the predicted SOC shifts relative to the behavior of the actual SOC.

When the hybrid ECU 39 determines that the change of the operation state of the auxiliary machines does not occur at 107, the hybrid ECU 39 proceeds to 108. At 108, the hybrid ECU 39 determines whether a change of a wind speed or a change of a wind direction occurs. When the wind speed or the wind direction changes, the vehicle speed changes, and the travel output and the travel pattern change. Thus, the output of the high-voltage battery 20 changes, and the behavior of the SOC changes. The change of the wind speed and the change of the wind direction are included in the SOC shift factor. In this case, the SOC shift factor is the environment change that predicts the behavior of the predicted SOC shifts from the behavior of the actual SOC.

When the hybrid ECU 39 determines that the change of the wind speed and the change of the wind direction do not occur at 108, the hybrid ECU 39 proceeds to 109. At 109, the hybrid ECU 39 determines whether a change of a road surface state occurs. In this case, the road surface state includes a wetting of the road surface due to a rain, a snow cover of the road surface due to a snow and a freezing of the road surface due to a decrease of a temperature. When the road surface state changes, the vehicle speed changes, and the travel output and the travel pattern change. In this case, the output of the high-voltage battery 20 changes, and the behavior of the SOC changes. The change of the road surface state is included in the SOC shift factor. In this case, the SOC shift factor is the environment change that predicts the behavior of the predicted SOC shifts relative to the behavior of the actual SOC.

When the hybrid ECU 39 determines that the change of the road surface state does not occur at 109, the hybrid ECU 39 proceeds to 110. At 110, the hybrid ECU 39 holds the discharge quantity for the discharge increasing control that is calculated previously. Operations in 105 to 109 function as a determination unit.

When the hybrid ECU 39 determines a positive determination at one of 105 to 109 (one of 105 to 109: Yes), the hybrid ECU 39 proceeds to 110. In this case, the hybrid ECU 39 determines that the behavior of the predicted SOC shifts from the behavior of the actual SOC or determines that the SOC shift factor occurs. At 110, the hybrid ECU 39 executes the SOC prediction and discharge quantity calculation routine again to execute the prediction of the SOC in the scheduled travel route again and the correct the discharge increasing control.

The SOC prediction and discharge quantity calculation routine shown in FIG. 5 is a sub routine of the main control routine shown in FIG. 4. The SOC prediction and discharge quantity calculation routine is executed at 110 and functions as a SOC prediction unit, a discharge quantity control unit and a correction unit.

When the present routine is activated, at 201, the hybrid ECU 39 acquires the own vehicle position information from the navigation device 45. Then, the hybrid ECU 39 proceeds to 202 and predicts the scheduled travel route based on the destination position information and the junctions of routes in the travelling direction from the navigation device 45. According to the present embodiment, the navigation device 45 functions as an acquisition unit and a route prediction unit.

Then, the hybrid ECU 39 proceeds to 203 and predicts the behavior of the road grade from the current position to the predetermined destination position in the scheduled travel route, based on the own vehicle position information and the scheduled travel route. Then, the hybrid ECU 39 proceeds to 204 and predicts the behavior of the vehicle speed from the current position to the predetermined destination position in the scheduled travel route, based on the own vehicle position information, the scheduled travel route, the limit speed information, the traffic information, the weather information and the peripheral information. According to the present embodiment, an operation in 203 functions as a road grade prediction unit, and an operation in 204 functions as a vehicle speed prediction unit.

Then, the hybrid ECU 39 proceeds to 205 and calculates the behavior of the travel output from the current position to the predetermined destination position in the scheduled travel route, based on the predicted results of the road grade and the vehicle speed. The hybrid ECU 39 calculates the behavior of the charge-or-discharge power that is the output of the high-voltage battery 20 from the current position to the predetermined destination position in the scheduled travel route, based on the predicted result of the travel output. The hybrid ECU 39 predicts the behavior of the SOC from the current position to the predetermined destination position in the scheduled travel route, based on the predicted result of the output of the high-voltage battery 20. According to the present embodiment, an operation in 205 functions as the SOC prediction unit.

Then, the hybrid ECU 39 proceeds to 206 and determines whether the high-voltage battery 20 is in the saturation state that the high-voltage battery 20 cannot be charged with the regeneration power, by determining whether the predicted SOC reaches the upper limit.

When the hybrid ECU 39 determines that the high-voltage battery 20 is not in the saturation state at 206, that is, when the hybrid ECU 39 determines that the predicted SOC does not reach the upper limit at 206, the hybrid ECU 39 proceeds to 207. At 207, the hybrid ECU 39 executes the fuel-consumption maximization charge-or-discharge quantity setting (the same as operation in 113 shown in FIG. 4).

When the hybrid ECU 39 determines that the high-voltage battery 20 is in the saturation state at 206, that is, when the hybrid ECU 39 determines that the predicted SOC reaches the upper limit at 206, the hybrid ECU 39 proceeds to 208. At 208, the hybrid ECU 39 calculates the assist discharge quantity and the EV discharge quantity for the discharge increasing control in the scheduled travel route, based on the predicted SOC exceeding quantity. For example, when the discharge increasing control is executed only by the assist discharge, the hybrid ECU 39 executes an assist discharge quantity calculation routine shown in FIG. 6 and calculates the assist discharge quantity for the discharge increasing control, at 208. According to the present embodiment, operations in 206 and 208 function as a discharge control unit, and operations in 201 to 208 function as the correction unit.

In the assist discharge quantity calculation routine shown in FIG. 6, at 301, the hybrid ECU 39 calculates the predicted SOC exceeding quantity. In this case, as shown in (a) of FIG. 10, the hybrid ECU 39 calculates a behavior of the predicted SOC exceeding quantity from the current position to the predetermined destination position in the scheduled travel route, based on the behavior of the predicted SOC from the current position to the predetermined destination position in the scheduled travel route.

Then, the hybrid ECU 39 proceeds to 302 and calculates a predicted engine operation time. In this case, as shown in (b) of FIG. 10, the hybrid ECU 39 calculates a behavior of the predicted engine operation time from the current position to the predetermined destination position in the scheduled travel route, based on a behavior of a predicted engine operation state from the current position to the predetermined destination position in the scheduled travel route.

Then, the hybrid ECU 39 proceeds to 303 and calculates the assist discharge quantity. In this case, as shown in (c) of FIG. 10, the hybrid ECU 39 calculates the assist discharge quantities by dividing the predicted SOC exceeding quantity by the predicted engine operation time each distance in the scheduled travel route, and sets the maximum value of the assist discharge quantities as an instruction assist discharge quantity that is a final assist discharge quantity. The hybrid ECU 39 executes the discharge increasing control to increase the discharge quantity of the high-voltage battery 20, by controlling the engine 11, the first MG 12 and the second MG 13 to achieve the assist discharge quantity.

According to the first embodiment, as the above description, the hybrid ECU 39 predicts the SOC in the scheduled travel route of the vehicle based on the predicted result of the road grade and the vehicle speed in the scheduled travel route. When the hybrid ECU 39 determines that the high-voltage battery 20 is in the saturation state based on the predicted SOC, the hybrid ECU 39 previously executes the discharge increasing control to increase the discharge quantity of the high-voltage battery 20 to prevent the high-voltage battery 20 from becoming in the saturation state based on the predicted SOC. Thus, when the predicted SOC is correct, the hybrid ECU 39 controls to prevent the SOC from reaching the upper limit by executing the discharge increasing control based on the predicted SOC. It can be prevented that the high-voltage battery 20 becomes in the saturation state.

After the start of the discharge increasing control, the hybrid ECU 39 determines whether the behavior of the predicted SOC shifts relative to the behavior of the actual SOC or whether the SOC shift factor occurs. When the hybrid ECU 39 determines that the behavior of the predicted SOC shifts relative to the behavior of the actual SOC or that the SOC shift factor occurs, the hybrid ECU 39 corrects the discharge increasing control by executing the prediction of the SOC in the scheduled travel route again. Thus, when the behavior of the predicted SOC shifts from the behavior of the actual SOC, the hybrid ECU 39 can correct the predicted SOC by executing the prediction of the SOC again. The hybrid ECU 39 corrects the discharge increasing control based on the predicted SOC that is corrected. Thus, it can be prevented that the high-voltage battery 20 is in the saturation state by controlling the SOC to be less than the upper limit by the discharge increasing control that is corrected. Thus, the hybrid ECU 39 can surely prevent the high-voltage battery 20 from becoming in the saturation state, can effectively use the regeneration power, and can effectively improve the fuel consumption.

According to the first embodiment, the hybrid ECU 39 calculates the SOC by subtracting the discharge-quantity increasing quantity in the discharge increasing control from the prediction time point of the predicted SOC to the present time point from the predicted SOC at the present time point when the discharge increasing control is not executed, as the predicted SOC at the current position when the discharge increasing control is executed. The hybrid ECU 39 determines that the behavior of the predicted SOC shifts from the behavior of the actual SOC by determining whether the difference between the predicted SOC at the current position when the discharge increasing control is executed and the actual SOC at the current position is greater than or equal to a predetermined value. The hybrid ECU 39 can accurately determine that the behavior of the predicted SOC shifts relative to the behavior of the actual SOC, by comparing the predicted SOC when the discharge increasing control is executed with the actual SOC.

According to the first embodiment, when the actual SOC is less than or equal to a predetermined value, the hybrid ECU 39 prohibits the discharge of the high-voltage battery 20, rotatably drives the first MG 12 or both the first MG 12 and the second MG 13 by the power of the engine 11, and generates power by the first MG 12 or both the first MG 12 and the second MG 13. Then, an excessive decreasing of the SOC can be suppressed.

According to the first embodiment, the hybrid ECU 39 uses the generation power of the first MG 12 or both the first MG 12 and the second MG 13 as the total of consumption powers of the auxiliary machines including the electric compressor 29. Then, the generation power of the first MG 12 or both the first MG 12 and the second MG 13 can be suppressed as small as possible, and the excessive decreasing of the SOC can be suppressed.

When the prediction of the scheduled travel route is difficult, the SOC cannot be correctly predicted. In this case, when the discharge increasing control is executed, it is possible that the fuel consumption is deteriorated due to an execution of the discharge increasing control based on an incorrect predicted SOC.

According to the first embodiment, when the prediction of the scheduled travel route is difficult, the hybrid ECU 39 prohibits the discharge increasing control. Thus, the hybrid ECU 39 can prevent the fuel consumption from being deteriorated due to the discharge increasing control based on the incorrect predicted SOC.

According to the first embodiment, when the high-voltage battery 20 is deteriorated, that is, when the deterioration state of the high-voltage battery 20 is greater than or equal to the predetermined state, the hybrid ECU 39 prohibits the discharge increasing control. When it is preferable that the charge-or-discharge of the high-voltage battery 20 is not executed while the high-voltage battery 20 is remarkably deteriorated, the hybrid ECU 39 prohibits the discharge increasing control. Thus, the hybrid ECU 39 can prevent the high-voltage battery 20 from being damaged.

According to the first embodiment, in the discharge increasing control, the hybrid ECU 39 increases the discharge quantity of the high-voltage battery 20, by the assist discharge to execute the discharge of the high-voltage battery 20 by the assist travel, or by the EV discharge to execute the discharge of the high-voltage battery 20 by the EV travel. Thus, the hybrid ECU 39 can increase the discharge quantity of the high-voltage battery 20 while effectively using the power of the high-voltage battery 20 by the assist discharge or the EV discharge by converting the power into a driving force of the vehicle.

In the discharge increasing control, the hybrid ECU 39 may increase the discharge quantity of the high-voltage battery 20 by both the assist discharge and the EV discharge, or the hybrid ECU 39 may increase the discharge quantity of the high-voltage battery 20 by one of the assist discharge and the EV discharge.

According to the first embodiment, the calculation of the assist discharge quantity when the discharge increasing control is executed only by the assist discharge is described. When the discharge increasing control is executed by both the assist discharge and the EV discharge, the calculation of the assist discharge quantity will be described as following.

When an output of MG that is the discharge power of the high-voltage battery 20 by the assist discharge becomes larger in a case where the travel output of the vehicle is small, the output of the engine 11 is decreased, and the engine 11 is operating at a region where the fuel consumption is bad and an efficiency of the engine 11 is low.

Figure 11:
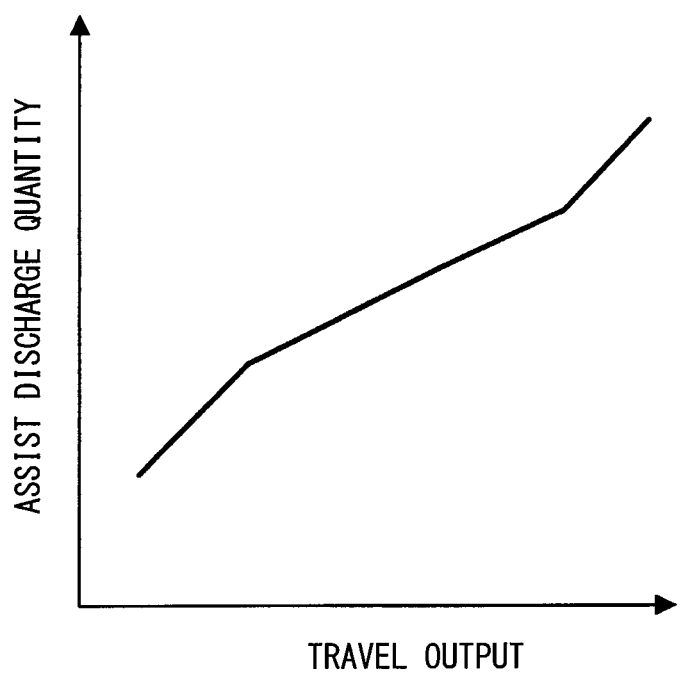
FIG. 11 is a graph showing a map of the assist discharge quantity according to a modification example of the first embodiment.

The hybrid ECU 39 calculates the assist discharge quantity according to the travel output of the vehicle by referring to a map of the assist discharge quantity shown in FIG. 11. According to the map of the assist discharge quantity, the assist discharge quantity is set to increase in accordance with an increase in travel output of the vehicle and to decrease in accordance with a decrease in travel output of the vehicle. Thus, the hybrid ECU 39 increases the discharge power of the high-voltage battery 20 by the assist discharge which is the assist discharge power in accordance with an increase in travel output of the vehicle and decreases the assist discharge power in accordance with a decrease in travel output of the vehicle.

Since the hybrid ECU 39 decreases the assist discharge power when the travel output of the vehicle is small, the engine 11 can operate at a region where the fuel consumption is good and the efficiency of the engine 11 is high without excessively decreasing the output of the engine 11. When the hybrid ECU 39 increases the assist discharge power in a case where the travel output of the vehicle is large, the output of the engine 11 is increased, and the engine 11 can operate at a region where the efficiency of the engine 11 is high.

Second Embodiment

Next, a second embodiment of the present disclosure will be described referring to FIG. 12. The substantially same parts and the components as the first embodiment are indicated with the same reference numeral and the same description will be omitted or simplified. Features of the second embodiment different from the first embodiment will be described.

Figure 12:
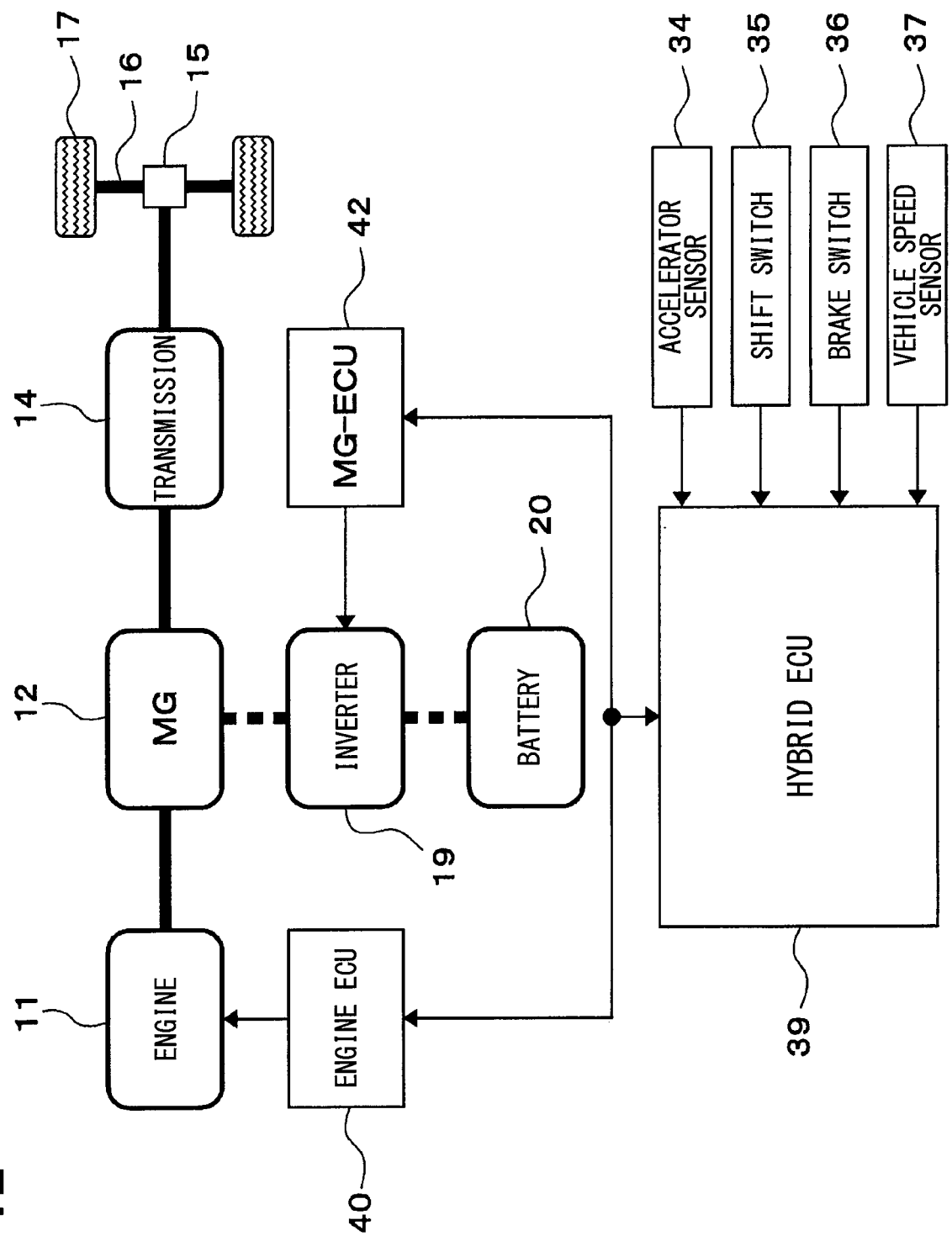
FIG. 12 is a schematic diagram showing an outline of the control system of the hybrid vehicle according to a second embodiment of the present disclosure.

According to the second embodiment, as shown in FIG. 12, the engine 11 and a MG 12 are mounted to the vehicle as the power sources of the vehicle. The power of the output shaft of the engine 11 is transmitted to the transmission 14 through the MG 12. The present disclosure may be applied to a hybrid vehicle having the above configuration.

According to the second embodiment, no clutch is in the power transmission channel from the engine 11 to the transmission 14. However, it is not limited. For example, a clutch may be located between the engine 11 and the MG 12, or a clutch may be located between the MG 12 and the transmission 14. Alternatively, a clutch may be embedded in the transmission 14. Further, the transmission 14 may be cancelled.

Third Embodiment

Next, a third embodiment of the present disclosure will be described referring to FIG. 13. The substantially same parts and the components as the first embodiment are indicated with the same reference numeral and the same description will be omitted or simplified. Features of the third embodiment different from the first embodiment will be described.

Figure 13:
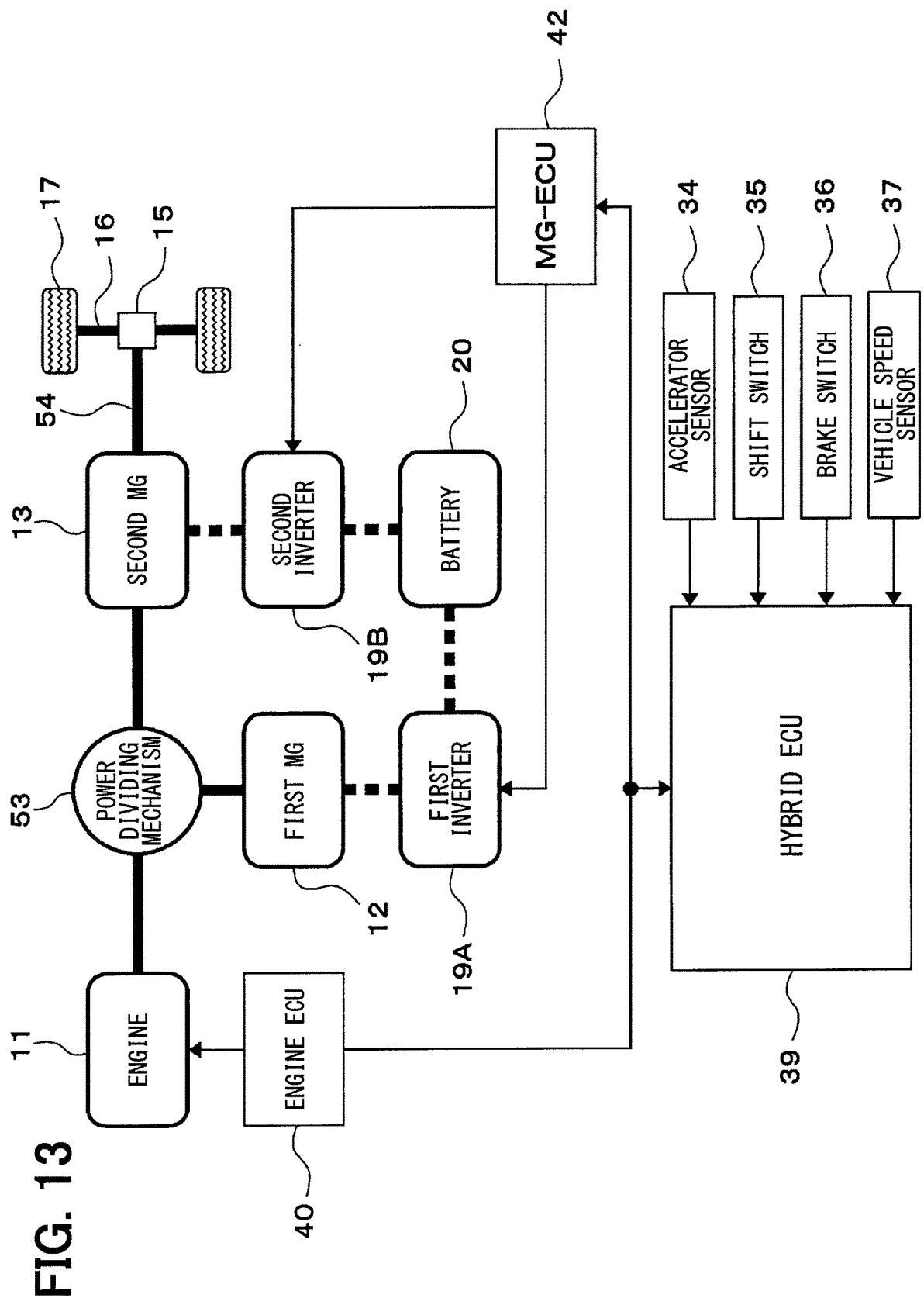
FIG. 13 is a schematic diagram showing an outline of the control system of the hybrid vehicle according to a third embodiment of the present disclosure.

According to the third embodiment, as shown in FIG. 13, the engine 11, the first MG 12 and the second MG 13 are mounted to the vehicle as the power sources of the vehicle. The output shaft of the engine 11, a rotation shaft of the first MG 12 and a rotation shaft of the second MG 13 are connected with each other through a planetary gear mechanism 53 that is a power dividing mechanism. The rotation shaft of the second MG 13 is connected with a drive shaft 54. The first MG 12 and the second MG 13 transfer power with the high-voltage battery 20 through a first inverter 19A and a second inverter 19B, respectively. The present disclosure may be applied to a hybrid vehicle having the above configuration.

The present disclosure is not limited to the hybrid vehicles shown in FIGS. 1, 12 and 13. The present disclosure can be applied to a hybrid vehicle having other configurations where an engine and a MG are mounted to the vehicle as the power sources of the vehicle.

A determination whether the behavior of the predicted SOC shifts from the behavior of the actual SOC is not limited to the above description and can be modified. For example, it may be determined that the behavior of the predicted SOC shifts relative to the actual SOC, when a difference is greater than or equal to a predetermined value. In this case, the difference is a difference between (i) the predicted SOC at the present time point when the discharge increasing control is not executed and (ii) the SOC. The SOC is obtained by adding the discharge-quantity increasing quantity in the discharge increasing control from the prediction time point of the predicted SOC to the present time point to the actual SOC at the current position.

According to the above embodiments, the hybrid ECU 39 determines whether the SOC shift factor occurs. The SOC shift factor includes the change of the travel route, the change of the operation state of the auxiliary machine, the change of the wind speed, the change of the wind direction and the change of the road surface state. It is not limited. The SOC shift factor may include a vehicle control or an environment change. The vehicle control includes a vehicle stop that is not predicted or a sudden acceleration or a sudden deceleration. The environment change includes a change of a temperature or a change of a pressure. In other words, the hybrid ECU 39 may determine whether the vehicle stop, the sudden acceleration, the sudden deceleration, the change of the temperature or the change of the pressure occurs.

The hybrid ECU 39 may cancel at least one of a function that generates power by rotatably driving the MG by the power of the engine while prohibiting the discharge of the high-voltage battery when the actual SOC is less than or equal to a predetermined value, a function that prohibits the discharge increasing control when the prediction of the scheduled travel route is difficult, or a function that prohibits the discharge increasing control when the deterioration state of the battery is greater than or equal to the predetermined state.

According to the above embodiments, the discharge quantity of the high-voltage battery is increased by the assist discharge or the EV discharge in the discharge increasing control. However, the discharge quantity of the high-voltage battery may be increased by other controls.

According to the above embodiments, the hybrid ECU 39 executes routines shown in FIGS. 4 to 6. However, it is not limited. An ECU other than the hybrid ECU 39 such as the engine ECU 40, the MG-ECU 42 or both the engine ECU 40 and the MG-ECU 42 may execute the routines. Alternatively, the hybrid ECU 39 and the ECU other than the hybrid ECU 39 may execute the routines.

At least a part of functions executed by the ECU may be configured by hardware including one or more integrated circuits (IC).

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The invention claimed is:

1. A controller for a vehicle including an engine and a motor generator as power sources of the vehicle and a battery that transfers power with the motor generator, the controller that charges the battery with a regeneration power that is a power regenerated by the motor generator when the vehicle is decelerated, the controller comprising:

an electronic control unit (ECU) configured to:

predict a SOC indicating a remaining capacity of the battery in a scheduled travel route of the vehicle, based on a predicted result of a road grade and a vehicle speed in the scheduled travel route;

execute a discharge increasing control to previously increase a discharge quantity of the battery to prevent the battery from becoming in a saturation state based on a predicted SOC that is the SOC predicted by the ECU, when ECU determines that the battery becomes in the saturation state where the battery cannot be charged with the regeneration power based on the predicted SOC;

determine whether a behavior of the predicted SOC shifts from a behavior of an actual SOC or determine whether a SOC shift factor occurs, after a start of the discharge increasing control, wherein the SOC shift factor is a vehicle control or an environment change that predicts the behavior of the predicted SOC shifts from the behavior of the actual SOC;

correct the discharge increasing control by executing a prediction of the SOC in the scheduled travel route again, when the ECU determines that the behavior of the predicted SOC shifts from the behavior of the actual SOC or determines that the SOC shift factor occurs; and determine whether at least one of a change of a wind speed, a change of a wind direction or a change of a road surface state occurs to determine whether the SOC shift factor occurs.

2. The controller for the vehicle according to claim 1, wherein the ECU is further configured to:
prohibit the discharge increasing control when a deterioration state of the battery is greater than or equal to a predetermined state.

3. The controller for the vehicle according to claim 1, wherein the ECU is further configured to:
increase the discharge quantity of the battery, by at least one of (i) an assist discharge to execute a discharge of the battery by an assist travel that drives the vehicle by both a power of the engine and a power of the motor generator or (ii) an EV discharge to execute the discharge of the battery by an EV travel that drives the vehicle by only the power of the motor generator, in the discharge increasing control.

4. The controller for the vehicle according to claim 3, wherein the ECU is further configured to:
increase a discharge power of the battery by the assist discharge in accordance with an increase in travel output of the vehicle, and decrease the discharge power of the battery by the assist discharge in accordance with a decrease in travel output of the vehicle.

5. The controller for the vehicle according to claim 1, wherein the ECU is further configured to:
predict a behavior of the road grade from a current position to a predetermined destination position in the scheduled travel route, based on an own vehicle position information and the scheduled travel route.

6. The controller for the vehicle according to claim 1, wherein the ECU is further configured to:
predict a behavior of the vehicle speed from a current position to a predetermined destination position in the scheduled travel route, based on an own vehicle position information, the scheduled travel route, a limit speed information, a traffic information, a weather information and a peripheral information.

7. A controller for a vehicle including an engine and a motor generator as power sources of the vehicle and a battery that transfers power with the motor generator, the controller that charges the battery with a regeneration power that is a power regenerated by the motor generator when the vehicle is decelerated, the controller comprising:
an electronic control unit (ECU) configured to:
predict a SOC indicating a remaining capacity of the battery in a scheduled travel route of the vehicle, based on a predicted result of a road grade and a vehicle speed in the scheduled travel route;

execute a discharge increasing control to previously increase a discharge quantity of the battery to prevent the battery from becoming in a saturation state based on a predicted SOC that is the SOC predicted by the ECU, when the ECU determines that the battery becomes in the saturation state where the battery cannot be charged with the regeneration power based on the predicted SOC;

determine whether a behavior of the predicted SOC shifts from a behavior of an actual SOC or determine whether a SOC shift factor occurs, after a start of the discharge increasing control, wherein the SOC shift factor is a vehicle control or an environment change that predicts the behavior of the predicted SOC shifts from the behavior of the actual SOC;

correct the discharge increasing control by executing a prediction of the SOC in the scheduled travel route again, when the ECU determines that the behavior of the predicted SOC shifts from the behavior of the actual SOC or determines that the SOC shift factor occurs;

prohibit the discharge increasing control when a prediction of the scheduled travel route is difficult; and determine that the prediction of the scheduled travel route is difficult when a destination position information of the vehicle is not obtained while a total number of junctions of routes in a travelling direction is greater than or equal to a predetermined value.

8. The controller for the vehicle according to claim 7, wherein the ECU is further configured to:
prohibit the discharge increasing control when a deterioration state of the battery is greater than or equal to a predetermined state.

9. The controller for the vehicle according to claim 7, wherein the ECU is further configured to:
increase the discharge quantity of the battery, by at least one of (i) an assist discharge to execute a discharge of the battery by an assist travel that drives the vehicle by both a power of the engine and a power of the motor generator or (ii) an EV discharge to execute the discharge of the battery by an EV travel that drives the vehicle by only the power of the motor generator, in the discharge increasing control.

10. The controller for the vehicle according to claim 7, wherein the ECU is further configured to:
predict a behavior of the road grade from a current position to a predetermined destination position in the scheduled travel route, based on an own vehicle position information and the scheduled travel route.

11. The controller for the vehicle according to claim 7, wherein the ECU is further configured to:
predict a behavior of the vehicle speed from a current position to a predetermined destination position in the scheduled travel route, based on an own vehicle position information, the scheduled travel route, a limit speed information, a traffic information, a weather information and a peripheral information.

\* \* \* \* \*